US010640025B2

(12) United States Patent
Suzuki

(10) Patent No.: US 10,640,025 B2
(45) Date of Patent: May 5, 2020

(54) VEHICLE SEAT

(71) Applicant: TACHI-S CO., LTD., Akishima-shi, Tokyo (JP)

(72) Inventor: Yukihiro Suzuki, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/081,887

(22) PCT Filed: Sep. 30, 2016

(86) PCT No.: PCT/JP2016/079100
§ 371 (c)(1),
(2) Date: Aug. 31, 2018

(87) PCT Pub. No.: WO2017/158893
PCT Pub. Date: Sep. 21, 2017

(65) Prior Publication Data
US 2019/0092199 A1    Mar. 28, 2019

(30) Foreign Application Priority Data

Mar. 16, 2016   (JP) ................................. 2016-052351

(51) Int. Cl.
*B60N 2/42*      (2006.01)
*B60N 2/427*    (2006.01)
(Continued)

(52) U.S. Cl.
CPC .............. *B60N 2/682* (2013.01); *B60N 2/20* (2013.01); *B60N 2/22* (2013.01); *B60N 2/68* (2013.01);
(Continued)

(58) Field of Classification Search
CPC . B60N 2/20; B60N 2/68; B60N 2/682; B60N 2/4235
(Continued)

(56) References Cited

U.S. PATENT DOCUMENTS 5,131,721 A  *  7/1992  Okamoto ................. B60N 2/75
                                                         297/452.18
5,988,756 A  *  11/1999  Aufrere .................... B60N 2/68
                                                         297/452.18 X
(Continued)

FOREIGN PATENT DOCUMENTS

JP      2010-280236 A    12/2010
JP      2011-025827 A     2/2011
(Continued)

OTHER PUBLICATIONS

International Search Report from International Patent Application No. PCT/JP2016/079100, dated Dec. 27, 2016.
(Continued)

*Primary Examiner* — Rodney B White
(74) *Attorney, Agent, or Firm* — SGPatents PLLC

(57) ABSTRACT

A vehicle seat is provided that can reduce a runout that occurs in a seat back frame. A seat back frame includes an upper frame part (301), a lower frame part (302), a first side frame part (303), and a second side frame part (301), which are formed as separate components and are joined to each other. The lower frame part (302) is provided in such a manner that a rotational axis (3A) is located on the inner side of the lower frame part (302). The seat back is rotated with respect to the seat cushion about the rotational axis (3A). One end portion in the width direction of the lower panel (305) is joined to the first side frame part (303). The other end portion in the width direction is joined to a second side frame part (304). A lower edge (305B) is joined to the lower frame part (302).

5 Claims, 9 Drawing Sheets

(51) Int. Cl.
*B60N 2/64* (2006.01)
*B60N 2/68* (2006.01)
*B60N 2/22* (2006.01)
*B60N 2/20* (2006.01)

(52) U.S. Cl.
CPC ...... *B60N 2205/20* (2013.01); *B60N 2205/30* (2013.01)

(58) Field of Classification Search
USPC .......................... 297/216.13, 452.18, 452.2
See application file for complete search history.

(56) References Cited

U.S. PATENT DOCUMENTS

| | | | | |
|---|---|---|---|---|
| 7,284,800 B2* | 10/2007 | Ishizuka | ................ | B60N 2/753 297/452.18 |
| 7,802,852 B2* | 9/2010 | Siegrist | ................ | B60N 2/686 297/452.18 |
| 8,550,563 B2* | 10/2013 | Nasshan | ................ | B60N 2/22 297/452.18 |
| 8,840,178 B2* | 9/2014 | Mitsuoka | ................ | B60N 2/20 297/216.13 |
| 8,960,790 B2* | 2/2015 | Fujita | ................ | B60N 2/4221 297/216.13 |
| 10,118,513 B2* | 11/2018 | Fujita | ................ | B60N 2/2231 |
| 2004/0227389 A1* | 11/2004 | Yoshida | ................ | B60N 2/64 297/452.18 |
| 2006/0273649 A1* | 12/2006 | Saberan | ................ | B60N 2/888 297/452.18 |
| 2009/0108661 A1* | 4/2009 | Ishijima | ................ | B60N 2/68 297/452.1 |
| 2010/0171356 A1* | 7/2010 | Gross | ................ | B60N 2/682 297/452.18 |
| 2010/0219674 A1* | 9/2010 | Sakkinen | ................ | B60N 2/0722 297/452.18 |
| 2010/0244538 A1* | 9/2010 | Gross | ................ | B60N 2/682 297/452.18 |
| 2011/0133538 A1* | 6/2011 | Adragna | ................ | B60N 2/1615 297/452.18 |
| 2011/0204691 A1* | 8/2011 | Schuhmacher | ................ | B60N 2/2356 297/354.12 |
| 2012/0112512 A1* | 5/2012 | Sakai | ................ | B60N 2/7017 297/452.18 |
| 2012/0256465 A1* | 10/2012 | Lilla | ................ | B60N 2/161 297/452.2 |
| 2012/0306250 A1* | 12/2012 | Line | ................ | B60N 2/68 297/452.1 X |
| 2012/0306253 A1* | 12/2012 | Seibold | ................ | B60N 2/68 297/452.18 X |
| 2013/0069415 A1* | 3/2013 | Yasuda | ................ | B60N 2/682 297/452.18 |
| 2013/0257117 A1* | 10/2013 | Seki | ................ | B60N 2/4228 297/216.1 |
| 2013/0278035 A1* | 10/2013 | Markel | ................ | B60N 2/22 297/354.1 |
| 2013/0334862 A1* | 12/2013 | Gibbs | ................ | B60N 2/682 297/452.18 |
| 2013/0341484 A1* | 12/2013 | Yamada | ................ | B60N 2/682 297/452.18 X |
| 2013/0341991 A1* | 12/2013 | Matsuzaki | ................ | B60N 2/68 297/452.18 |
| 2014/0224041 A1* | 8/2014 | Ozawa | ................ | B60N 2/002 73/862.381 |
| 2014/0224553 A1* | 8/2014 | Ozawa | ................ | B60N 2/002 177/136 |
| 2014/0232158 A1* | 8/2014 | Sano | ................ | B60N 2/68 297/354.1 |
| 2014/0232162 A1 | 8/2014 | Mitsuhashi | | |
| 2014/0317931 A1* | 10/2014 | Fujita | ................ | B60N 2/682 29/897.2 |
| 2014/0375098 A1* | 12/2014 | Kitou | ................ | B60N 2/682 297/391 |
| 2014/0375099 A1* | 12/2014 | Kitou | ................ | B60N 2/682 297/391 |
| 2015/0091359 A1* | 4/2015 | Kitou | ................ | B60N 2/68 297/452.18 |
| 2015/0097404 A1* | 4/2015 | Furuta | ................ | B60N 2/68 297/452.18 X |
| 2015/0183354 A1* | 7/2015 | Fushikida | ................ | B60N 2/68 297/452.18 |
| 2015/0203000 A1* | 7/2015 | Fujita | ................ | B60N 2/4228 297/216.14 |
| 2015/0203001 A1* | 7/2015 | Akutsu | ................ | B60N 2/68 297/216.13 |
| 2015/0203012 A1* | 7/2015 | Fujita | ................ | B60N 2/682 297/284.9 |
| 2015/0203013 A1* | 7/2015 | Akutsu | ................ | B60N 2/64 297/452.18 |
| 2015/0210188 A1* | 7/2015 | Hoshi | ................ | B60N 2/68 297/344.12 |
| 2015/0210194 A1* | 7/2015 | Furuta | ................ | B60N 2/68 297/452.18 X |
| 2015/0210195 A1* | 7/2015 | Fujita | ................ | B60N 2/4228 297/452.18 |
| 2015/0231997 A1* | 8/2015 | Itoi | ................ | B60N 2/682 297/391 |
| 2015/0246627 A1* | 9/2015 | Shimizu | ................ | B60N 2/66 297/216.14 |
| 2015/0291072 A1* | 10/2015 | Ito | ................ | B60N 2/72 297/452.2 |
| 2015/0336528 A1* | 11/2015 | Tanabe | ................ | B60R 21/207 280/728.2 |
| 2016/0009210 A1* | 1/2016 | Sasaki | ................ | B60N 2/5657 297/452.18 X |
| 2016/0250950 A1* | 9/2016 | Omori | ................ | B60N 2/66 29/897.2 |

FOREIGN PATENT DOCUMENTS

| | | |
|---|---|---|
| JP | 2011-230629 A | 11/2011 |
| JP | 2014-091439 A | 5/2014 |
| JP | 2014-117323 A | 6/2014 |
| JP | 2014-156212 A | 8/2014 |

OTHER PUBLICATIONS

Extended European Search Report dated Oct. 8, 2019, in European Patent Application No. EP16894510.3.

* cited by examiner

VEHICLE SEAT

TECHNICAL FIELD

The present invention relates to a vehicle seat for use in a vehicle, the vehicle seat on which a passenger is seated.

BACKGROUND ART

As the background art of the present technical field, there is known a vehicle seat described in Japanese Unexamined Patent Application Publication No. 2014-091439 (PTL 1). PTL 1 describes a seat back frame formed in a nearly rectangular shape having four frame parts, an upper frame part, a lower frame part, an inner side frame part, and an outer side frame part, which form a skeletal outline for a seat back (see paragraph 0016 and FIG. 2). The seat back frame is a pipe frame in which the four frame parts are integrally formed by bending one pipe material. The seat back frame has round (curved or arc) bent portions (coupling portions) that couple the frame parts to each other. Two end portions of the pipe material are coupled to each other in the center of the lower frame in the width direction.

The seat back frame further includes an outer bracket fixed to the outer side frame and an inner bracket fixed to the inner side frame. In the configuration, the outer bracket holds the outer end of a reclining shaft and the inner bracket holds the inner end (the end portion on the inner side) of the reclining shaft (see paragraph 0017).

CITATION LIST

Patent Literature

PTL 1: Japanese Unexamined Patent Application Publication No. 2014-091439

SUMMARY OF INVENTION

Technical Problem

The seat back frame for use in the vehicle seat of PTL 1, one pipe material is bent in a nearly rectangular shape having four frame parts that are the upper frame part, the lower frame part, the inner side frame part, and the outer side frame part. Thus, when the pipe material is bent, a runout occurs in the seat back frame. In the case in which a runout occurs in the seat back frame, a problem arises that it is difficult to reliably provide riding comfort and comfortability when a passenger is seated.

An object of the present invention is to provide a vehicle seat that improves riding comfort and comfortability when a passenger is seated under normal conditions by decreasing a runout that occurs in a seat back frame.

Solution to Problem

In order to achieve the object, a vehicle seat according to the present invention includes a seat cushion on which a person is seated, and a seat back erected at a rear end of the seat cushion. The seat back is rotatably configured with respect to the seat cushion. In the vehicle seat, a seat back frame forms a skeletal outline for the seat back. The seat back frame includes an upper frame part formed of a pipe material, the upper frame part being placed on an upper part of the seat back frame, a lower frame part formed of a pipe material, the lower frame part being placed on a lower part of the seat back frame, a first side frame part formed of a plate member, the first side frame part being coupled between the upper frame part and the lower frame part on one side in a width direction of the vehicle seat, a second side frame part formed of a plate member, the second side frame part being coupled between the upper frame part and the lower frame part on the other side in the width direction, and a lower panel placed near the lower frame part. The upper frame part, the lower frame part, the first side frame part, and the second side frame part are formed as separate components, and the upper frame part, the lower frame part, the first side frame part, and the second side frame part are joined to configure the seat back frame. The lower frame part is provided in a manner that a rotational axis about which the seat back is rotated with respect to the seat cushion is located on an inner side of the lower frame part. One end portion in the width direction of the lower panel is joined to the first side frame part, the other end portion in the width direction is joined to the second side frame part, and a lower edge is joined to the lower frame part.

Advantageous Effects of Invention

In accordance with the present invention, the components described above are included. Thus, the present invention enables a reduction in a runout that occurs in the seat back frame of the vehicle seat, enables reliable provision of riding comfort and comfortability when a passenger is seated, and enables the improvement of the protection performance for passengers when the rear side of a vehicle is crashed.

DESCRIPTION OF EMBODIMENTS

In the following, an embodiment of the present invention will be described.

Figure 1:
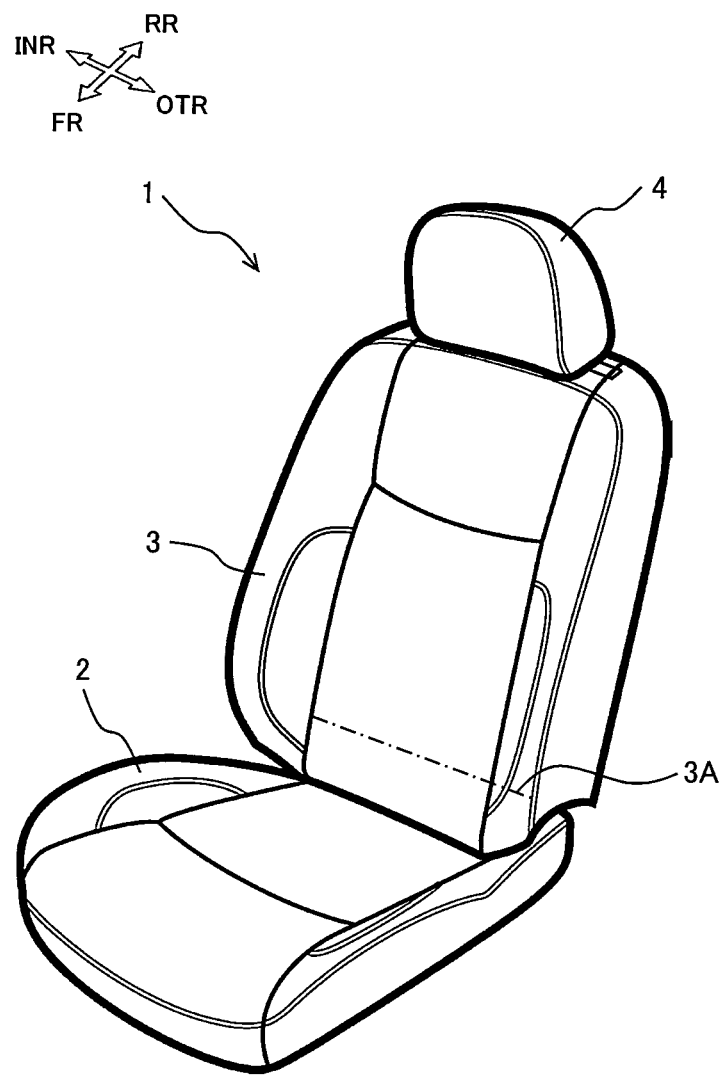
FIG. 1 is a perspective view of a vehicle seat 1 according to one embodiment of the present invention.

FIG. 1 is a perspective view of a vehicle seat 1 according to one embodiment of the present invention.

Note that, in the following description, the direction of a plumb line is defined in such a manner that a vertical direction relative to the case in which a vehicle installed with the vehicle seat 1 is placed on a horizontal plane. The longitudinal direction (FR, RR) is defined in such a manner that the direction is matched with the longitudinal direction of the vehicle. The lateral direction (the width direction) is defined in such a manner that the direction is matched with the width direction of the vehicle. The direction FR is the front side direction of the vehicle. The direction RR is the rear side direction of the vehicle. Regarding the vehicle seat 1, in the description, the side located on the center side of the width direction is referred to as an inner (INR) side, and the side located on the end portion side of the width direction is referred to as an outer (OTR) side.

As shown in FIG. 1, the vehicle seat 1 includes a seat cushion 2 on which a person is seated, a seat back 3 erected at the rear end of the seat cushion 2, and a head rest 4 provided on the upper end portion of the seat back 3.

The seat cushion 2 is mounted on a vehicle floor in such a manner that the position of the seat cushion 2 is adjustable in the longitudinal direction.

The seat back 3 is a portion configuring a backrest. The seat back 3 is coupled to the seat cushion 2 in such a manner that the seat back 3 is rotatable about a rotational axis (a rotational center line or a rotational axis) 3A provided on a lower end portion. That is, the vehicle seat is provided with a reclining function that tilts the seat back 3 backward and a forward tilt function that tilts the seat back 3 forward. The seat back 3 is rotatably configured with respect to the seat cushion 2. Note that, in FIG. 1, the rotational axis 3A covered with a cushion material and a cover is depicted by an alternate long and short dash line.

The head rest 4 is mounted on the seat back 3 with its height position adjustable.

The seat cushion 2, the seat back 3, and the head rest 4 are provided with a frame that is a skeletal member and with a cushion material formed of resin foam, for example, in their insides. In the configuration, the surface of the cushion material is covered with a cover.

Figure 2:
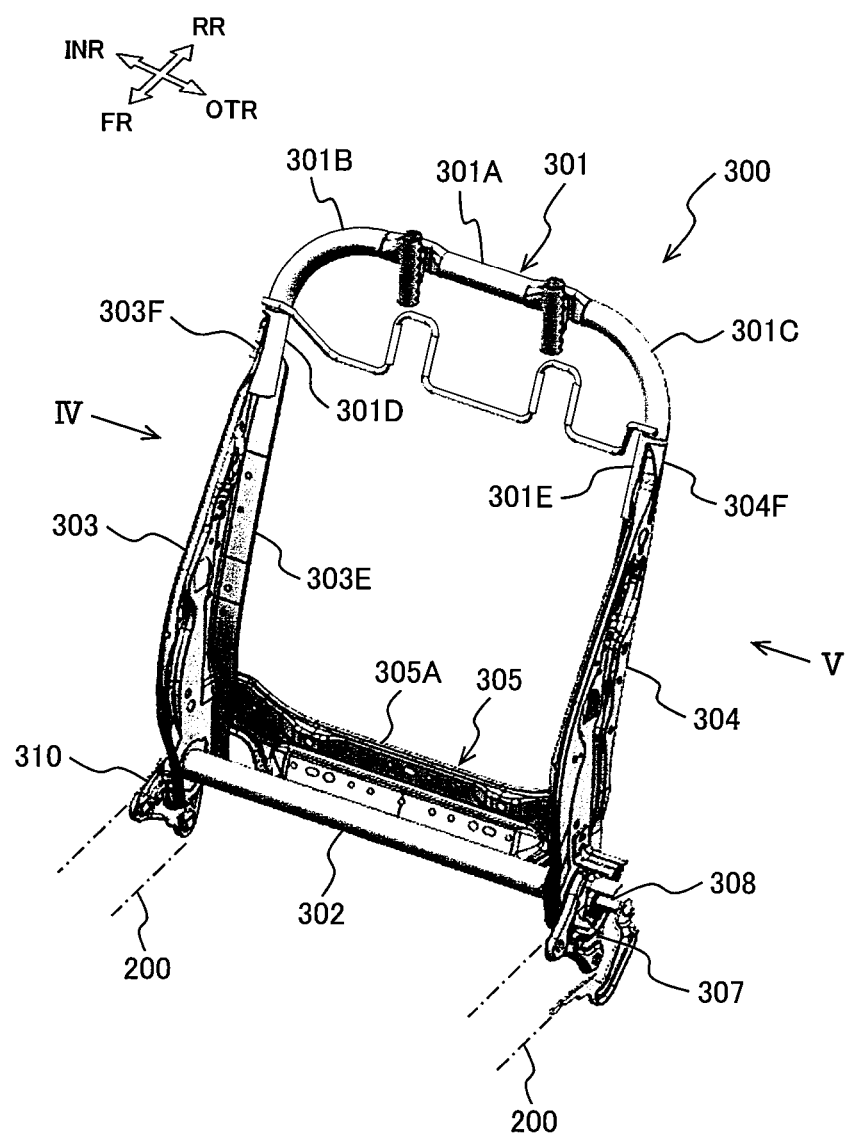
FIG. 2 is a perspective view of the configuration of a seat back frame 300 according to one embodiment of the present invention.

FIG. 2 is a perspective view of the configuration of a seat back frame 300 according to one embodiment of the present invention.

The seat back frame 300 that is the skeletal outline for the seat back 3 is formed in a nearly rectangular shape having an upper frame part 301, a lower frame part 302, an inner side frame part 303, and an outer side frame part 304.

The upper frame part 301 is formed by bending one pipe material. That is, the upper frame part 301 is configured of a horizontal portion (a lateral portion) 301A extending in the horizontal direction, an inner side bent portion 301B bent on the inner side, an outer side bent portion 310C bent on the outer side, an inner side vertical portion 301D extending from the lower end portion of the inner side bent portion 301B toward the seat cushion 2 side, and an outer side vertical portion 301E extending from the lower end portion of the outer side bent portion 310C toward the seat cushion 2 side.

The inner side bent portion 301B is the portion at which the extending direction of the pipe material is changed from the horizontal portion 301A toward the inner side vertical portion 301D. The portion 301B can be regarded as a part of the inner side vertical portion 301D. The outer side bent portion 310C is the portion at which the extending direction of the pipe material is changed from the horizontal portion 301A toward the outer side vertical portion 301E. The portion 310C can be regarded as a part of the outer side vertical portion 301E. Thus, the upper frame part 301 is configured of at least the horizontal portion 301A, the inner side vertical portion 301D extending in the vertical direction from the inner side end portion of the horizontal portion 301A toward the seat cushion 2 side, and the outer side vertical portion 301E extending in the vertical direction from the outer side end portion of the horizontal portion 301A toward the seat cushion 2 side.

On the horizontal portion 301A of the upper frame part 30, a mounting part 306 on which the head rest 4 is mounted is provided.

The lower frame part 302 is located on the side opposite to the rectangular upper frame part 301, and configured of one straight pipe material. The lower frame part 302 is placed concentrically with the rotational axis 3A of the seat back 3 (see FIG. 1). That is, the rotational axis 3A of the seat back 3 is placed on the center axis of the pipe material configuring the lower frame part 302. That is, the seat back 3 is rotatably configured in such a manner that the upper end portion is rotated in the longitudinal direction about the center axis of the lower frame part 302. Thus, in the present embodiment, the rotational axis 3A is placed on the inner side (on the inner circumferential side) of the pipe material configuring the lower frame part 302.

The inner side frame part 303 is a plate-shaped member formed by press working. The upper end portion is coupled to the inner side vertical portion 301D of the upper frame part 301 by welding. Thus, on the upper end portion of the inner side frame part 303, an arc shaped portion 303F is formed. The portion 303F is in contact with the outer circumferential surface of the inner side vertical portion 301D. The arc shaped portion 303F is formed in such a manner that the horizontal cross section forms an arc shape with the longitudinal direction of the inner side frame part 303 arranged along the direction of a plumb line. On the other hand, the lower end portion of the inner side frame part 303 is coupled to the inner side end portion of the lower frame part 302. In the present embodiment, the inner side frame part 303 is fixed to the lower frame part 302. The fixing structure will be described later in detail.

The outer side frame part 304 is a plate-shaped member formed by press working. The upper end portion is coupled to the outer side vertical portion 301E of the upper frame part 301 by welding. Thus, on the upper end portion of the outer side frame part 304, an arc shaped portion 304F is formed. The portion 304F is in contact with the outer circumferential surface of the outer side vertical portion 301E. The arc shaped portion 304F is formed in such a manner that the horizontal cross section forms an arc shape with the longitudinal direction of the outer side frame part 304 arranged along the direction of a plumb line. On the other hand, the lower end portion of the outer side frame part 304 is coupled to the outer side end portion of the lower frame part 302. In the present embodiment, the outer side frame part 304 is fixed to the lower frame part 302. The fixing structure will be described later in detail.

In the present embodiment, a lower panel 305 is provided on the lower frame part 302 side of the seat back frame part 300. The lower panel 305 is the reinforcement member (the reinforcement panel) of the seat back frame 300. The lower panel 305 is a plate-shaped member formed by press-working a metal plate member. The lower panel 305 is placed near the lower frame part 302. In the state in which the seat back is vertically erected with respect to the seat cushion 2, an upper edge 305A is located above the lower frame part 302, and both end portions in the width direction are coupled to the inner and the outer side frame parts 303 and 304.

That is, the inner side end portion of the lower panel 305 is connected and fixed to the inner side frame part 303 by welding, and the outer side end portion is connected and fixed to the outer side frame part 304 by welding in such a manner that at least the inner side frame part 303 is coupled to the outer side frame part 304. In the present embodiment, the inner side end portion of the lower panel 305 is welded to the back surface (the surface facing the rear side of the vehicle) of a back surface side bent portion 303E of the inner side frame part 303, and the outer side end portion is welded to the back surface (the surface facing the rear side of the vehicle) of the back surface side bent portion, not shown, of the outer side frame part 304. Note that, the back surface side bent portion, not shown, of the outer side frame part 304 is formed on the outer side frame part 304 similarly to the back surface side bent portion 303E of the inner side frame part 303.

In the present embodiment, a lower edge 305B of the lower panel 305 (see FIG. 3) is connected and fixed to the lower frame part 302 by welding.

On the lower end portion of the inner side frame part 303, an inner bracket 310 is provided. The inner bracket 310 is rotatably mounted on the inner side frame part 303 about the rotational axis 3A. A seat cushion frame 200 of the seat cushion 2 is fixed to the inner bracket 310.

On the lower end portion of the outer side frame part 304, an outer bracket 307 is provided. The outer bracket 307 is rotatably mounted on the outer side frame part 304 about the rotational axis 3A. The seat cushion frame 200 of the seat cushion 2 is fixed to the outer bracket 307.

Figure 3:
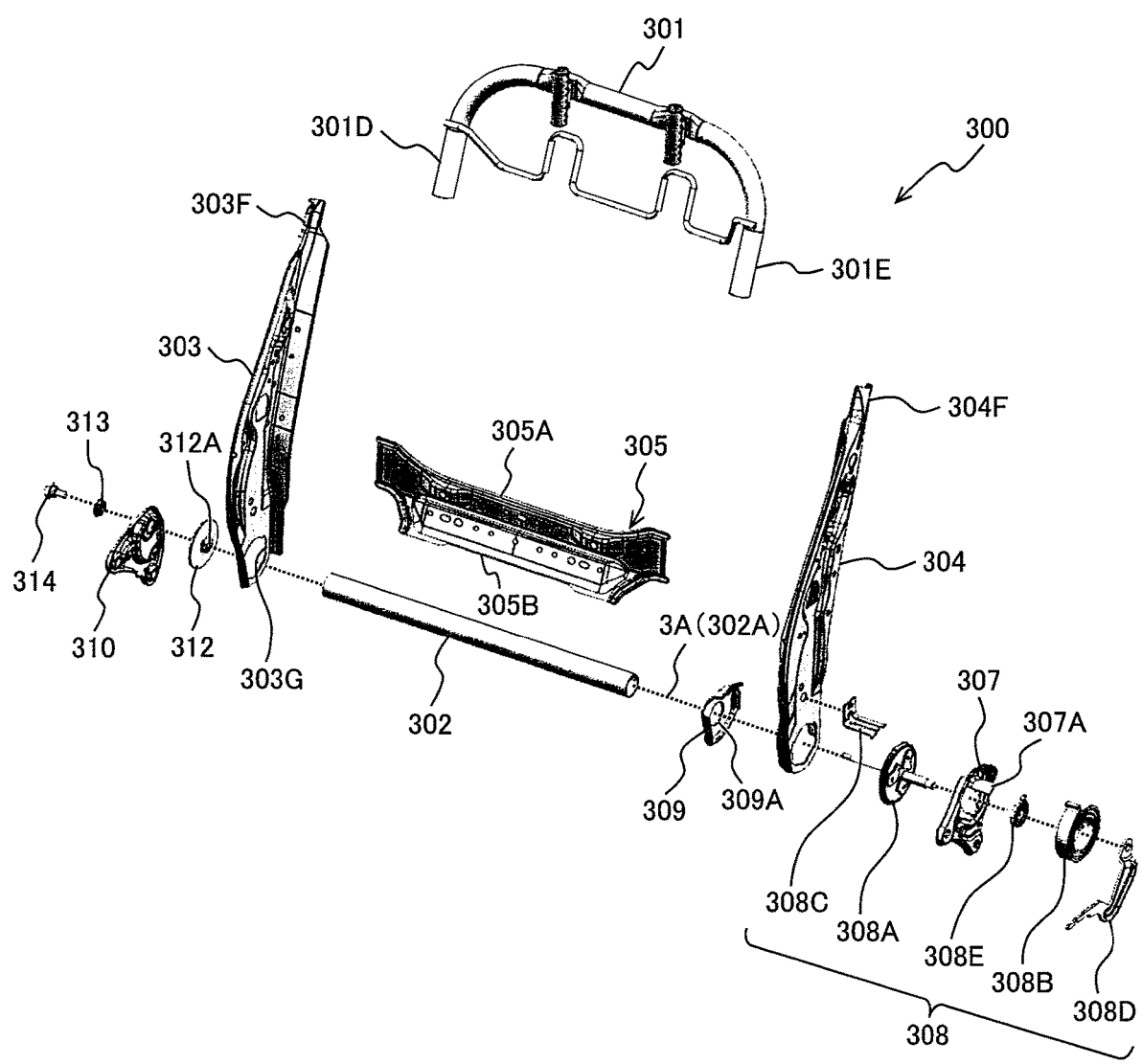
FIG. 3 is an exploded view of the seat back frame 300 according to one embodiment of the present invention.

FIG. 3 is an exploded view of the seat back frame 300 according to one embodiment of the present invention.

On the lower end portion of the outer side frame part 304 of the seat back frame 300, a reclining mechanism 308 is provided. The reclining mechanism 308 includes a reclining device 308A, a return spring 308B, a lever spring 308E, an operating lever 308D, and a hook 308C.

The reclining device 308A is placed in such a manner that the device 308A is present between the outer side frame part 304 and the outer bracket 307. The device 308A rotatably supports the outer side frame part 304 on the outer bracket 307. The reclining device 308A includes a locking mechanism 308AD (see FIG. 7). The device 308A can make the seat back frame 300 stationary at a given reclining angle.

The return spring 308B is placed in such a manner that the spring 308B is present between the outer side frame part 304 and the outer bracket 307. The spring 308B gives a biasing force in the forward tilt direction to the outer side frame part 304 (the seat back 3).

The hook 308C configures a retaining part on which one end portion of the return spring 308B is retained. The hook 308C is fixed to the outer side frame part 304. The other end portion of the return spring 308B is retained on a retaining part 307A provided on the outer bracket 307.

The operating lever 308D is the lever that operates the reclining mechanism. The operating lever 308D is operated to unlock the locking mechanism 308AD of the reclining mechanism.

The lever spring 308E is placed between the operating lever 308D and the outer bracket 307. The lever spring 308E biases the operating lever 308D in the returning direction (in the locking direction of the locking mechanism 308AD).

The lower frame part 302 is coupled to the outer side frame part 304 through a pipe bracket (a lower frame bracket) 309. The outer side end portion of the lower frame part 302 is inserted into an opening 309A provided on the pipe bracket 309. The outer circumferential part of the lower frame part 302 is fixed to the pipe bracket 309 by welding. The outer edge of the pipe bracket 309 is fixed to the inner side surface of the outer side frame part 304 by welding. The configuration of the connecting part will be described later in detail.

The inner side end portion of the lower frame part 302 is abutted on a hinge bracket 312 through an opening 303G formed on the lower end portion of the inner side frame part 303, and the inner side end portion is fixed to the hinge bracket 312 by welding. The hinge bracket 312 is in contact with the outer side surface of the inner side frame part 303 from the outside of the vehicle seat 1 so as to block the opening 303G. The bracket 312 is fixed to the inner side frame part 303 by welding.

The hinge bracket 312 is provided with a screw hole 312A through which a hinge bolt 314 is screwed. The inner bracket 310 is rotatably mounted on the inner side frame part 303 with the hinge bolt 314 and a hinge bush 313.

In the present embodiment, on the rotational axis 3A of the seat back 3 (the seat back frame 300), i.e. on the center axis 302A of the lower frame part 302, the hinge bolt 314, the hinge bush 313, the inner bracket 310, the hinge bracket 312, the pipe bracket 309, the outer bracket 307, and the reclining mechanism 308 are mounted on the seat back frame 300.

In the present embodiment, the locking mechanism 308AD of the reclining mechanism 308 is provided on the outer side frame part 304 side. However, the locking mechanism 308AD may be provided on both of the outer side frame part 304 side and the inner side frame part 303 side. In the present embodiment, the outer side frame part 304 side where the reclining mechanism 308 is provided is locked in the rotating direction by the locking mechanism 308AD. On the other hand, the inner side frame part 303 side is not locked in the rotating direction, which is always lock free.

Figure 4:
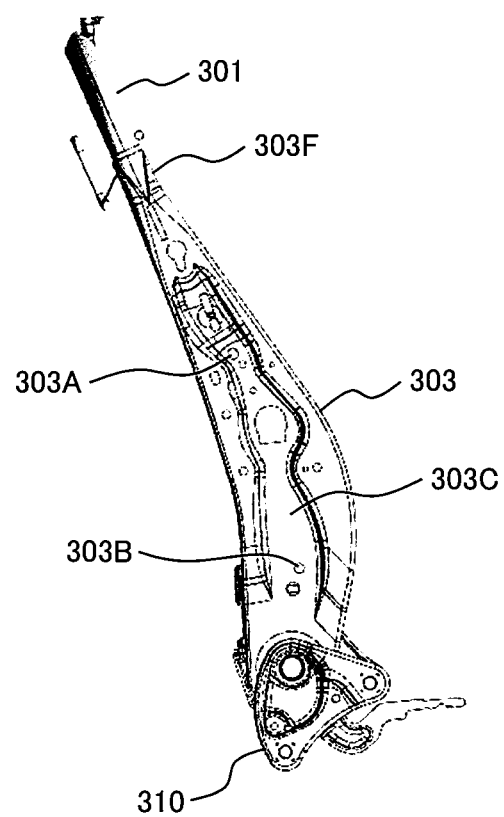
FIG. 4 is a plan view of the structure of an inner side frame part 303 of the seat back frame 300 according to one embodiment of the present invention.
Figure 5:
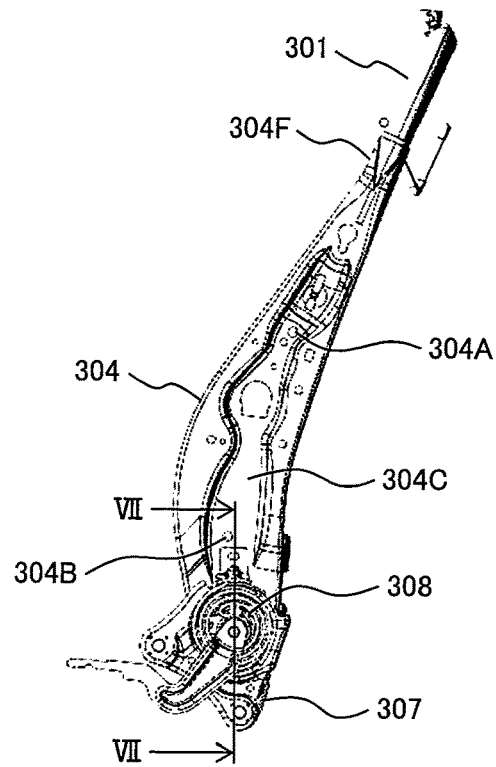
FIG. 5 is a plan view of the structure of an outer side frame part 304 of the seat back frame 300 according to one embodiment of the present invention.

FIG. 4 is a plan view of the structure of the inner side frame part 303 of the seat back frame 300 according to one embodiment of the present invention. FIG. 5 is a plan view of the structure of the outer side frame part 304 of the seat back frame 300 according to one embodiment of the present invention. Note that, FIG. 4 is a plan view of the inner side frame part 303 viewed from the direction of arrow IV shown in FIG. 2, and FIG. 5 is a plan view viewed from the direction of arrow V shown in FIG. 2.

In the present embodiment, in the seat back frame 300, the upper frame part 301, the lower frame part 302, the inner side frame part 303, and the outer side frame part 304 are directly joined and assembled to each other by welding or joined to each other through another component by welding. Thus, the frame parts have to be positioned when welded.

In the present embodiment, the inner and the outer side frame parts 303 and 304 are provided with positioning holes (location holes) 303A, 303B, 304A, and 304B. The positioning holes 303A and 303B are separately placed on the top end side and the lower end side with respect to the center part of the inner side frame part 303 in the longitudinal direction. The positioning holes 304A and 304B are separately placed on the top end side and the lower end side with respect to the center part of the outer side frame part 304 in the longitudinal direction.

The inner side frame part 303 is provided with the opening 303G and the arc shaped portion 303F described above in addition to the positioning holes 303A and 303B.

On the side surface of the inner side frame part 303, a recessed portion 303C is formed. The recessed portion 303C has a recess when viewed from the direction of arrow IV shown in FIG. 2. The recessed portion 303C improves the stiffness of the plate-shaped inner side frame part 303.

The inner and the outer side frame parts 303 and 304 are formed in symmetry (bilateral symmetry) to a plane that passes through the center part in the width direction and is in parallel with the direction of a plumb line and the longitudinal direction. Thus, the outer side frame part 304 has an opening (not shown), the arc shaped portion 304F, and a recessed portion 304C, which correspond to the opening 303G, the arc shaped portion 303F, and the recessed portion 303C, respectively.

Figure 6:
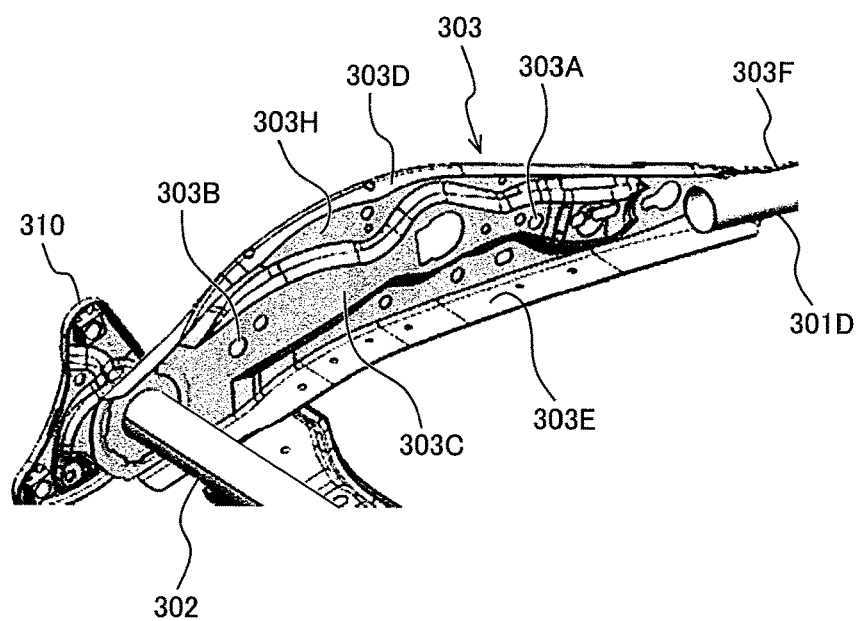
FIG. 6 is a perspective view of the inner side frame part 303 of the seat back frame 300 according to one embodiment of the present invention when viewed from the center side of the vehicle seat 1.

FIG. 6 is a perspective view of the inner side frame part 303 of the seat back frame 300 according to one embodiment of the present invention when viewed from the center side of the vehicle seat 1.

Since the inner and the outer side frame parts 303 and 304 are formed in bilateral symmetry, the configuration of the inner side frame part 303 described with FIG. 6 is also provided on the outer side frame part 304.

On the front surface side (the front edge side) of a side surface (a flat surface) 303H where the recessed portion 303C of the inner side frame part 303 is provided, a front surface side bent portion (a front edge side bent portion) 303D is provided. On the back surface side (on the rear edge side or the back surface side) of the side surface 303H of the inner side frame part 303, the back surface side bent portion (rear edge side bent portion or the back surface side bent portion) 303E is provided.

The back surface side of the back surface side bent portion 303E configures the joining part of the lower panel 305, and also exerts the effect of improving the stiffness of the inner side frame part 303. The front surface side bent portion 303D and the back surface side bent portion 303E exert the effect of reducing the damage against a passenger, in the case in which a passenger is hit.

Figure 7:
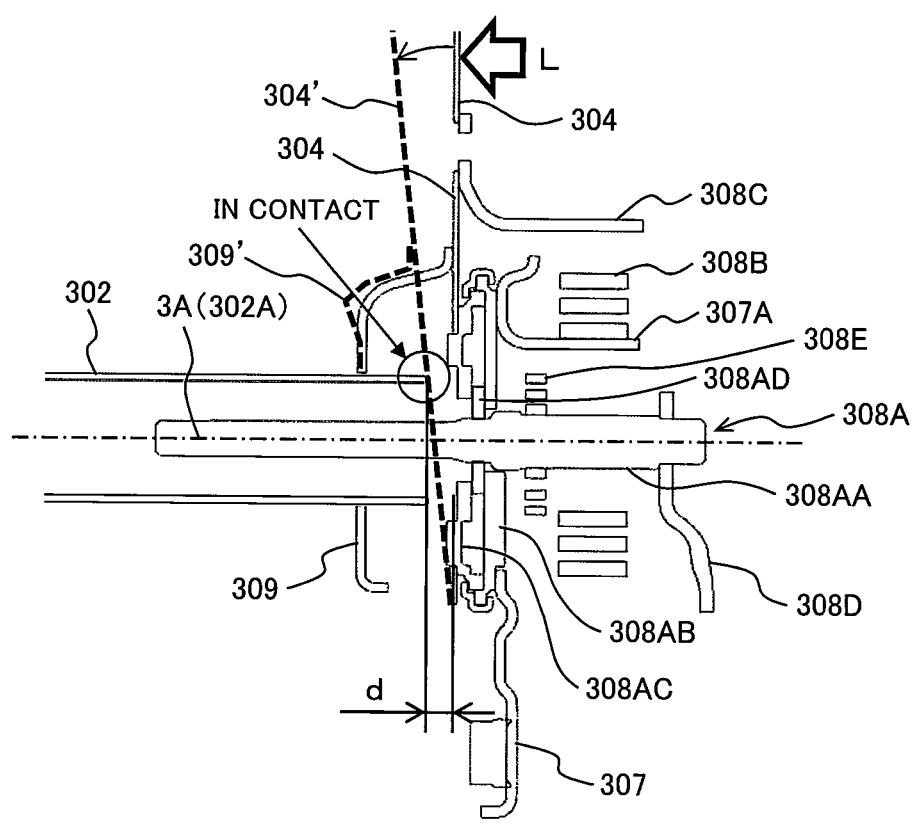
FIG. 7 is a cross sectional view of the configuration of the connecting part of a lower pipe part 302 to the outer side frame part 304 where a reclining mechanism 308 is provided.

FIG. 7 is a cross sectional view of the configuration of the connecting part of the lower pipe part 302 to the outer side frame part 304 where the reclining mechanism 308 is provided.

The reclining device 308A includes a hinge pin 308AA, a first plate 308AB, a second plate 308AC, and the locking mechanism 308AD.

The first plate 308AB is joined to the outer bracket 307 by welding, and fixed to the outer bracket 307. The second plate 308AC is joined to the outer side frame part 304 by welding, and fixed to the outer side frame part 304. The first and the second plates 308AB and 308AC are configured slidably in the rotation direction where the rotational axis 3A is the center axis.

The locking mechanism 308AD is placed on the inner side of the first and the second plates 308AB and 308AC, and coupled to the hinge pin 308AA. On the one end portion of the hinge pin 308AA, the operating lever 308D is provided. The locking mechanism 308AD is configured using a mechanism similar to a previously existing mechanism. The mechanism 308AD can switch between the locked state and the unlocked state by operating the operating lever 308D. The locking mechanism 308AD is unlocked to tilt the seat back 3 forward or backward. The locking mechanism 308AD is locked to fix the seat back 3 at a given forward or backward position.

Note that, the center axis of the hinge pin 308AA is matched with the rotational axis 3A of the seat back 3 (the seat back frame 300), which is concentrically aligned with the rotational axis 3A, and the center axis of the lower frame part 302 is also matched with the rotational axis 3A, which is concentrically aligned with the rotational axis 3A.

As described above, the one end portion of the return spring 308B is retained on the hook 308C fixed to the outer side frame part 304, and the other end portion is retained on the retaining part 307A of the outer bracket 307.

As described above, the lever spring 308E is placed between the hinge pin 308AA (the operating lever 308D) and the outer bracket 307. Specifically, the one end portion of the lever spring 308E is retained on the hinge pin 308AA, and the other end portion is retained on the retaining part 307A of the outer bracket 307.

In the present embodiment, the inner side end portion of the lower frame part 302 is inserted into the opening 303G of the inner side frame part 303, and the end portion is abutted on the hinge bracket 312. In this state, a spacing having a gap d is provided between the outer side end portion of the lower frame part 302 and the side surface of the outer side frame 304.

The gap d absorbs the variation in dimensions in the longitudinal direction of the lower frame part 302 when the seat back frame 300 is assembled. In the case in which the lower frame part 302 is abutted on the hinge bracket 312 and the lower frame part 302 is welded to the hinge bracket 312, a jig is inserted into the gap d to press the lower frame part 302 against the hinge bracket 312.

Figure 8:
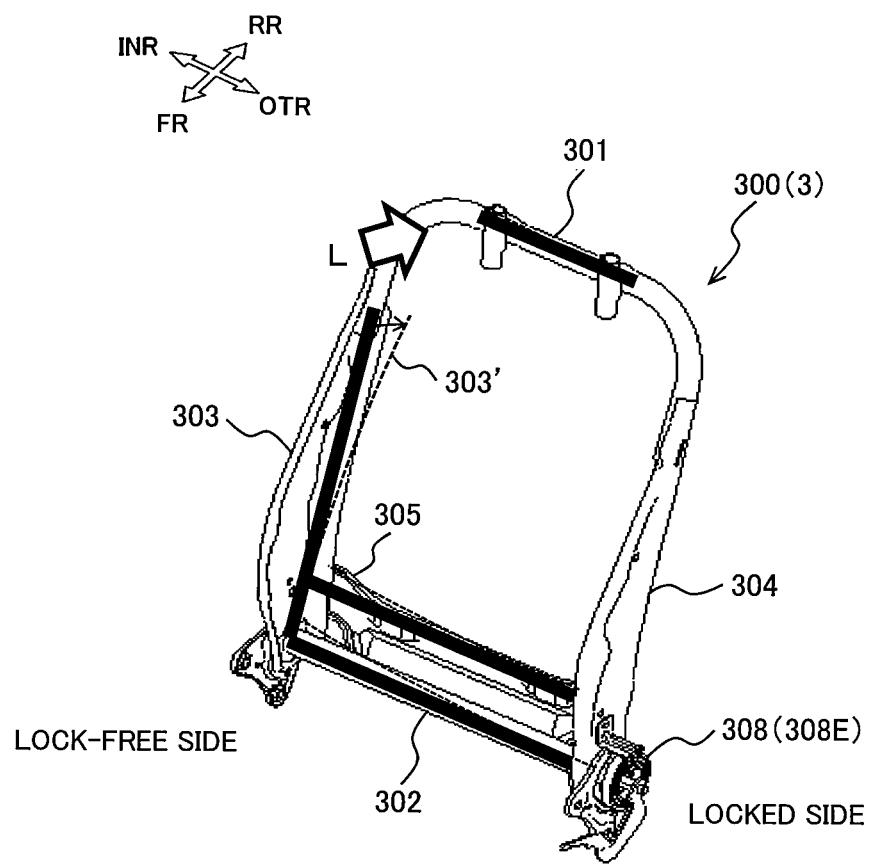
FIG. 8 is a diagram illustrative of a load L acting on a lock-free side upper end portion of the seat back frame 300 and the state of a runout of the seat back frame 300 due to the load L.

Here, referring to FIGS. 8 and 9, the relationship between a load L acting on the seat back frame 3 and the deformed state of the seat back frame 3 will be described. FIG. 8 is a diagram illustrative of the load L acting on a lock-free side upper end portion of the seat back frame 300 and the state of a runout of the seat back frame 300 due to the load L.

When the longitudinal load L acts on the upper part of the seat back 3 from the front side FR to the rear side RR, the upper part of the seat back 3 is displaced toward the rear side so as to tilt the seat back 3 backward. Specifically, in the present embodiment, the locking mechanism 308E of the reclining mechanism 308 is not provided on the inner side frame part 303 side. In the following, in the seat back frame 300, the side where the seat back frame 300 is locked by the locking mechanism 308AD of the reclining mechanism 308 is referred to as a locked side, and the side where the seat back frame 300 is not locked by the locking mechanism 308AD because no reclining mechanism 308 is provided is referred to as a lock-free side.

When the longitudinal load L acts on the seat back frame 300 as shown in FIG. 8, specifically on the lock-free side where the seat back frame 300 is not locked by the locking mechanism 308AD (the inner side frame part 303 side), the inner side frame part 303 is greatly tilted backward, and the upper part of the inner side frame part 303 (the shoulder of the seat back frame 300) is greatly displaced on the rear side. As described above, the load that distorts the seat back frame 300 to the outside of the rectangular surface formed by the seat back frame 300 (in the direction vertical to the rectangular surface) is referred to as a load in the direction of torsion, and the deformation of the seat back frame 300 produced at this time is referred to as deformation in the direction of torsion.

The stiffness of the upper frame part 301, the stiffness of the lower frame part 302, the stiffness of the inner side frame part 303, and the stiffness of the outer side frame part 304 against the load in the direction of torsion are referred to as the torsional stiffness of the upper frame part 301, the torsional stiffness of the lower frame part 302, the longitudinal stiffness of the inner side frame part 303, and the longitudinal stiffness of the outer side frame part 304, respectively.

In the present embodiment, the longitudinal stiffness of the inner side frame part 303 and the longitudinal stiffness of the outer side frame part 304 are improved by the recessed portions 303C and 304C, the front surface side bent portion 303D, the back surface side bent portion 303E, and any other components. The torsional stiffness of the upper frame part 301 and the torsional stiffness of the lower frame part 302 are improved using a pipe material for the frame parts 301 and 302. Note that, the outer side frame part 304 has the front surface side bent portion and the back surface side bent portion similar to the front surface side bent portion 303D and the back surface side bent portion 303E of the inner side frame part 303, which is as described above.

In the present embodiment, the torsional stiffness of the seat back frame 300 against the load in the direction of torsion is improved by the torsional stiffness of the upper frame part 301, the torsional stiffness of the lower frame part 302, the longitudinal stiffness of the inner side frame part 303, and the longitudinal stiffness of the outer side frame part 304.

However, in the present embodiment, one of the side frame parts (in the present embodiment, the inner side frame part 303 side) is lock free. Thus, the upper and the lower frame parts 301 and 302 have high torsional stiffness, and the inner and the outer side frame parts 303 and 304 have high longitudinal stiffness. However, the case can be considered in which as the entire seat back frame 300 in an assembly of the frame parts, torsional stiffness against the longitudinal load L as describe above is sometimes especially insufficient.

Therefore, in the present embodiment, in order to improve the torsional stiffness, a lower panel 5 is provided. The lower panel 5 is connected to the inner side frame part 303, the outer side frame part 304, and the lower frame part 302, and hence the lower panel 5 improves the torsional stiffness of the entire seat back frame 300. In the case in which the longitudinal load L acts on the locked side (the outer side frame part 304 side), deformation in the direction of torsion sometimes occurs in the seat back frame 300, which, however, is not so large as the deformation on the lock-free side. The lower panel 5 also enables a reduction in the deformation.

Figure 9:
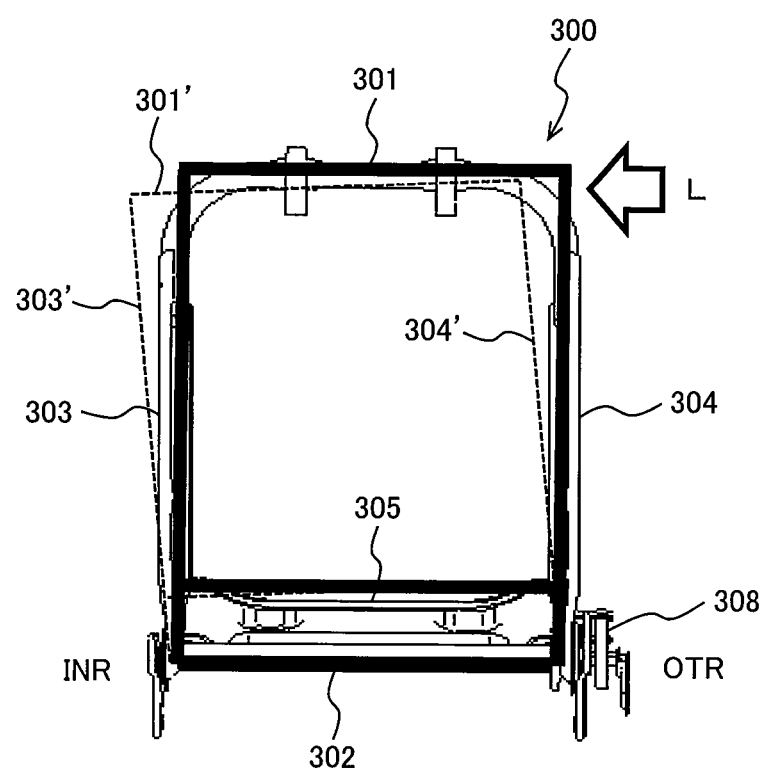
FIG. 9 is a diagram illustrative of a load acting on the seat back frame 300 in the lateral direction and the state of a runout of the seat back frame 300 due to the load.

FIG. 9 is a diagram of a load acting on the seat back frame 300 in the lateral direction and the state of a runout of the seat back frame 300 due to the load.

As shown in FIG. 9, in the case in which the lateral load L acts from the lateral side of the seat back 3 on the seat back frame 300, the seat back frame 300 is distorted nearly in a parallelogram. When the deformation occurs and distorts the seat back frame 300 nearly in a parallelogram, the upper frame part 301, the inner side frame part 303, and the outer side frame part 304 are in the states depicted by dotted lines 301', 303', and 304', respectively.

As described above, the load that acts from the lateral side of the seat back 3 so as to distort the seat back frame 300 nearly in a parallelogram is referred to as a lateral load, and the deformation of the seat back frame 300 produced at this time is referred to as lateral deformation.

The stiffness of the inner side frame part 303 against the lateral load is referred to as the lateral stiffness of the inner side frame part 303. The stiffness of the outer side frame part 304 against the lateral load is referred to as lateral stiffness of the outer side frame part 304. The stiffness of the lower panel 305 against the lateral load is referred to as the lateral stiffness of the lower panel 305.

In the present embodiment, the lateral stiffness of the inner side frame part 303 and the lateral stiffness of the outer side frame part 304 are improved by the recessed portions 303C and 304C, the front surface side bent portion 303D, the back surface side bent portion 303E, and any other components. Note that, the outer side frame part 304 has the front surface side bent portion and the back surface side bent portion similar to the front surface side bent portion 303D and the back surface side bent portion 303E of the inner side frame part 303, which is as described above.

In the present embodiment, the inner and the outer side frame parts 303 and 304 with improved lateral stiffness are used, these frame parts 303 and 304 are coupled to each other using the upper and the lower frame parts 301 and 302 configured of a pipe material, and hence the lateral stiffness of the seat back frame part 300 is improved. However, with the joining structure of the lower frame part 302, the inner side frame part 303, and the outer side frame part 304, in the case in which an especially large lateral load L, which acts on the seat back frame part 300, lateral stiffness is sometimes insufficient in the entire seat back frame 300.

Therefore, in the present embodiment, in order to improve the lateral stiffness, the lower panel 5 is provided. The lower panel 5 is connected to the inner side frame part 303, the outer side frame part 304, and the lower frame part 302, and hence the lower panel 5 improves the lateral stiffness of the entire seat back frame 300.

In FIG. 9, the lateral load L that acts from the outer side is described. However, the same thing is applied in the case in which the lateral load L acts from the inner side.

In the present embodiment, the configuration that improves the lateral stiffness of the entire seat back frame 300 is provided. Again referring to FIG. 7, the configuration that improves the lateral stiffness will be described.

When the lateral load L acts on the outer side frame part 304 as shown in FIG. 7, the pipe bracket 309 is deformed as depicted by a dotted line 309', and the outer side frame part 304 leans in the lateral direction as depicted by the dotted line 304'. In this case, the gap d is made smaller, and hence this enables a reduction in the leaning of the outer side frame part 304 as depicted by the dotted line 304'. That is, this prevents the outer side frame part 304 from further leaning caused by contact of the upper part of the lower frame part 302 with the outer side frame part 304 that has leaned.

The gap d only has to be the minimum size in the range necessary to absorb the variation in dimensions of the lower frame part 302 described above and the minimum size through which the jig described above can be inserted. The gap d only has to have the size in which the outer side frame part 304 is abutted on the lower frame part 302 over the gap d in the case in which the lateral load assumed in the seat back frame 300 is applied to the seat back frame 300 or a load in conformance with the specifications is applied to the seat back frame 300.

Note that, in FIG. 7, in the case in which the lateral load L going from the inner side toward the outer side is applied to the inner side of the vehicle seat 1, the outer side frame part 304 leans in the direction reverse to the direction in FIG. 7. In this case, the lower part of the lower frame part 302 comes into contact with the outer side frame part 304, and this prevents the outer side frame part 304 from leaning in the lateral direction.

The inner side and the outer side of the vehicle seat 1 are replaced between the driver side and the passenger side.

Therefore, the side where the gap d is configured is not limited to the outer side frame part 304 side.

Figure 10:
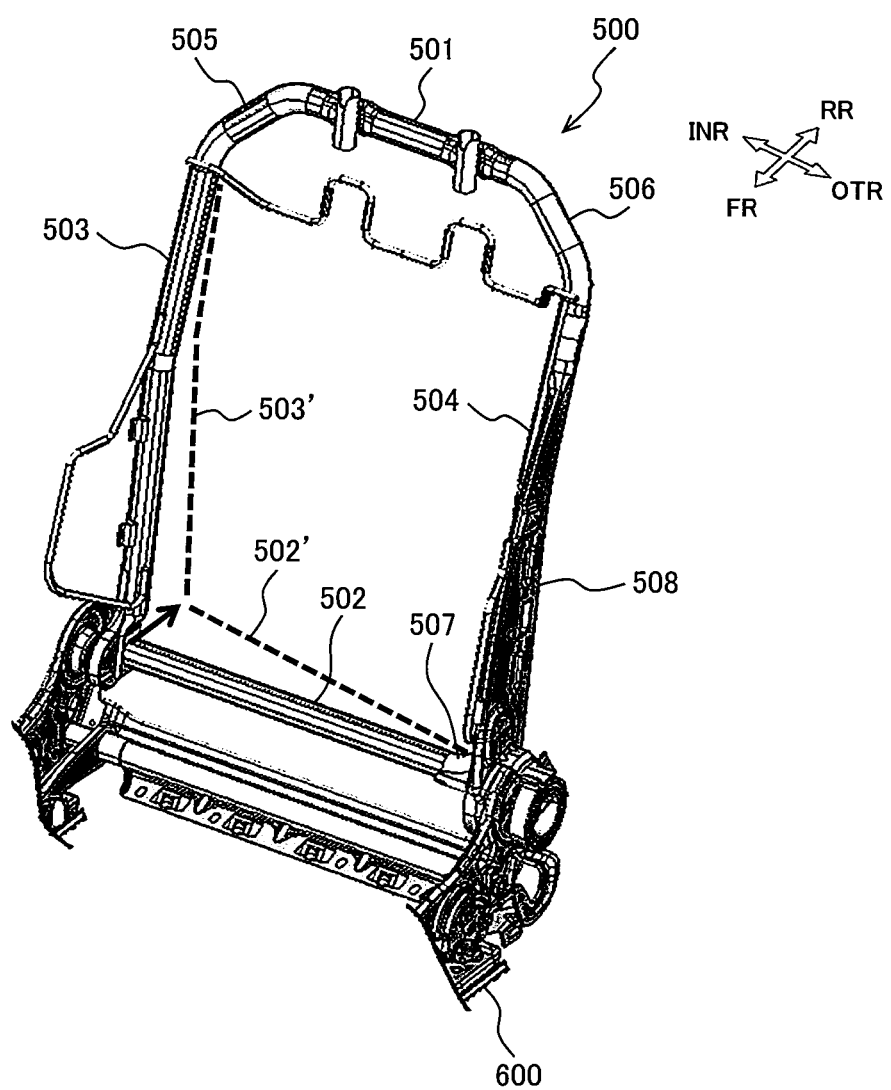
FIG. 10 is a diagram illustrative of the state of a runout that occurs in a seat back frame in a comparative example with the present invention.

FIG. 10 is a diagram of the state of a runout that occurs in the seat back frame in a comparative example with the present invention.

In the comparative example shown in FIG. 10, one pipe material is bent to configure a nearly rectangular seat back frame 500. The seat back frame 500 has an upper frame part 501, a lower frame part 502, an inner side frame part 503, and an outer side frame part 504. The inner side end portion of the lower frame part 502 is joined to the lower end portion of the inner side frame part 503.

The comparative example has an accumulation of errors in the bending direction and errors at the bending positions at a bent portion 505 between the inner side frame part 503 and the upper frame part 501, a bent portion 506 between the upper frame part 501 and the outer side frame part 504, and a bent portion 507 between the outer side frame part 504 and the lower frame part 502. A runout depicted by dotted lines 502' and 503' then occurs in the seat back frame 500 in joining the inner side end portion of the lower frame part 502 to the lower end portion of the inner side frame part 503.

The runout depicted by the lines 502' and 503' causes positional displacement or deformation in the rotating hinge between the seat back frame 500 and a seat cushion frame 600. The runout increases the sliding resistance generated on the rotating hinge between the frames 500 and 600. As a result, the seat back frame 500 has to be operated for forward tilt or for backward tilt with a large force, resulting in the degradation of the operability of the vehicle seat.

In the present embodiment, the upper frame part 301, the lower frame part 302, the inner side frame part 303, and the outer side frame part 304 are four separate components. These four components are joined to each other, and the seat back frame 300 is formed. Errors in the components can be absorbed at the joining parts of the components, and hence this enables the prevention or a reduction in a runout of the seat back frame 300. In the case in which the seat back frame 300 is formed by bending one pipe material, a large-sized facility has to be provided. However, the seat back frame 300 is separated into four components (frame parts), and hence this enables a reduction in the size of the components. Thus, a large-sized facility is unnecessary, and a reduction in manufacturing costs is enabled.

In the seat back frame 300 according to the present embodiment, the reclining mechanism is provided on the lower frame 302 side, and this side is a portion to support the seat back 3. The top end side (the side where the head rest 4 is mounted) of the seat back 3 is the free end, and the top end side is supported in a cantilever form on the lower frame 302 side. Although the components on the upper frame 301 side are the parts formed by bending a pipe material, the components on the lower frame 302 side have a joining structure in which a straight pipe material is abutted on the plate surfaces of the inner side frame 303 and the outer side frame 304 (actually, other components are present between the frames 303 and 304). Thus, an external force acting on the seat back frame 300 is likely to cause a large deformation on the lower frame 302 side of the seat back frame 300.

In the present embodiment, the lower panel 305 reinforces the lower frame 302 side of the seat back frame 300, and hence this enables a reduction in deformation that occurs on the lower frame 302 side of the seat back frame 300. The present embodiment specifically enables the improvement of the stiffness (the lateral stiffness) of the seat back frame 300 against the external force L acting on the seat back frame 300 in the width direction (in the lateral direction) and the stiffness (torsional stiffness) of the seat back frame 300 against the external force L acting on the seat back frame 300 in the longitudinal direction. The deformation that occurs on the lower frame 302 side of the seat back frame 300 is reduced, and hence this enables reliable provision of the smooth operation of the reclining function.

In the seat back frame of PTL 1, the reclining shaft configuring the rotational axis is provided separately from the lower frame. In contrast to PTL 1, the present embodiment has the configuration in which the lower frame 302, which also provides the rotational axis 3A, also serves as the reclining shaft in such a manner that the rotational axis 3A is located on the inner side of the lower frame 302. That is, the lower frame 302 is positioned on the rotational axis 3A, and hence the deformation of the inner and the outer brackets 310 and 307 is prevented or reduced. Thus, the lower frame 302 constantly keeps the spacing between the inner and the outer brackets 310 and 307. Consequently, this enables reliable provision of the smooth operation of the reclining function.

In the seat back frame of PTL 1, an outer hinge bracket is provided on the outer side frame part configured of a pipe material. The outer hinge bracket has a shape similar to the shape of the outer side frame part 304 of the present embodiment. In the present embodiment, the outer side frame part 304 can also serve as the outer hinge bracket of PTL 1, and hence this enables a reduction in the number of parts.

In the present embodiment, the opening 303G is provided on the inner side frame part 303. However, the opening 303G is unnecessary when the inner side frame part 303 is just connected to the lower frame part 302. The opening 303G is provided on the inner side frame part 303, and hence this enables a configuration in which the outer side frame part 304 provided with the reclining mechanism 308 and the inner side frame part 303 are formed in bilateral symmetry. The hinge bracket 312 is provided in order to join the lower frame part 302 to the inner side frame part 303.

Since the hinge bracket 312 is provided, the screw hole 312A only has to be provided through which the hinge bolt 314 is screwed to the hinge bracket 312 in a small size. Thus, this enables easy handling of the components, and enables easy work of handling the components.

The inner and the outer side frame parts 303 and 304 are formed in bilateral symmetry, and hence this enables the provision of the reclining mechanism 308 also on the inner side frame part 303. In this case, the locking mechanism 308AD can be provided on both sides of the inner and the outer side frame parts 303 and 304, and deformation in the direction of torsion in the seat back frame 300 can be reduced.

The inner and the outer side frame parts 303 and 304 are formed in bilateral symmetry, and hence this enables the assembling of the vehicle seat for the driver and the vehicle seat for the passenger using the same inner side frame part 303 and the same lower frame part 302. Thus, this enables a reduction in manufacturing costs.

The inner side and the outer side of the vehicle seat 1 are replaced between the driver side and the passenger side. The inner side and the outer side are not limited to the description of the embodiment above. A configuration in which the inner side is replaced by the outer side can be provided.

The vehicle seat 1 is provided with the reclining function that tilts the seat back 3 backward and the forward tilt function that tilts the seat back 3 forward. The seat back 3 is rotatably configured with respect to the seat cushion 2. When a runout occurs in the seat back frame 300, stress is applied to the rotating hinge that is the coupling portion between the seat back frame 300 and the seat cushion frame 200. This increases sliding resistance generated between the frames 300 and 200 in rotating (reclining or tilting forward) the seat back 3 (the seat back frame 300) with respect to the seat cushion 2 (the seat cushion frame 200). Thus, a problem arises that a large force is necessary or the seat back 3 is unsmoothly rotated, for example, when the seat back 3 is rotated with respect to the seat cushion 2.

The present embodiment enables a reduction in a runout that occurs in the seat back frame 300. Thus, the vehicle seat 1 according to the present embodiment enables the elimination of a large force or unsmooth rotation when the seat back 3 is rotated with respect to the seat cushion 2.

In the case in which the seat back frame is formed by bending one pipe material, a reduction in a runout that occurs in the seat back frame is desired, the processing accuracy of bending the pipe material has to be improved, resulting in an increase in manufacturing costs.

In the present embodiment, the number of the bending portions of the pipe material is reduced, and errors that occur in the bending portions can be absorbed, and hence the improvement of the processing accuracy of the bending portions is nonurgent. Accordingly, a reduction in manufacturing costs of the vehicle seat 1 is enabled.

REFERENCE SIGNS LIST

1 . . . vehicle seat
2 . . . seat cushion
3 . . . seat back
3A . . . rotational axis
4 . . . head rest
200 . . . seat cushion frame
300 . . . seat back frame
301 . . . upper frame part
301A . . . horizontal portion (lateral portion) of upper frame part 301
301B . . . inner side bent portion of upper frame part 301
301C . . . outer side bent portion of upper frame part 301
301D . . . inner side vertical portion of upper frame part 301
301E . . . upper frame part 301 outer side vertical portion
302 . . . lower frame part
302A . . . center axis of the lower frame part 302
303 . . . inner side frame part
303A, 303B . . . positioning hole (the location hole) of inner side frame part 303
303C . . . recessed portion of inner side frame part 303
303D . . . front surface side bent portion of inner side frame part 303
303E . . . back surface side bent portion of inner side frame part 303
303F . . . arc shaped portion of inner side frame part 303
303G . . . opening of inner side frame part 303
303H . . . side surface (flat surface) of inner side frame part 303
304 . . . outer side frame part
304A, 304B . . . positioning hole (the location hole) of outer side frame part 304
304F . . . arc shaped portion of outer side frame part 304
305 . . . lower panel
305A . . . upper edge of lower panel 305
305B . . . lower edge of lower panel 305
306 . . . mounting part of head rest 4
307 . . . outer bracket
307A . . . retaining part
308 . . . reclining mechanism
308A . . . reclining device
308AA . . . hinge pin
308AB . . . first plate
308AC . . . second plate
308AD . . . locking mechanism
308B . . . return spring
308C . . . hook
308D . . . operating lever
308E . . . lever spring
309 . . . pipe bracket (lower frame bracket)
309A . . . opening of pipe bracket 309
310 . . . inner bracket
312 . . . hinge bracket
312A . . . screw hole
313 . . . hinge bush
314 . . . hinge bolt

The invention claimed is:

1. A vehicle seat comprising:
a seat cushion on which a person is seated; and
a seat back erected at a rear end of the seat cushion, the seat back being rotatably configured with respect to the seat cushion,
wherein:
a seat back frame forming a skeletal outline for the seat back includes
an upper frame part formed of a pipe material, the upper frame part being placed on an upper part of the seat back frame,
a lower frame part formed of a pipe material, the lower frame part being placed on a lower part of the seat back frame,
a first side frame part formed of a plate member, the first side frame part being coupled between the upper frame part and the lower frame part an one side in a width direction of the vehicle seat,
a second side frame part formed of a plate member, the second side frame part being could coupled between the upper frame part and the lower frame part on the other side in the width direction, and
a lower panel joined to the lower frame part;
the upper frame part, the lower frame part, the first side frame part, and the second side frame part are formed as separate components, and the upper frame part, the lower frame part, the first side frame part, and the second side frame part are joined to configure the seat back frame;
the lower frame part is provided in a manner that a rotational axis about which the seat back is rotated with respect to the seat cushion is located on an inner side of the lower frame part;
one end portion of the lower panel in the width direction is joined to the first side frame part, the other end portion of the lower panel in the width direction is joined to the second side frame part, and a lower edge portion of the lower panel is joined to the lower frame part;
a pipe bracket is provided between the lower frame part and the second side frame part, the pipe bracket joining the lower frame part to the second side frame part; and
the pipe bracket is joined to the lower frame part with an end portion of the lower frame part inserted into an opening of the pipe bracket in a manner that a gap in the width direction is provided between the end portion of the lower frame part and the second side frame part.

2. The vehicle seat according to claim 1, wherein the first side frame part has an opening formed on a lower end portion, and
a hinge bracket joined to an outer side surface of the first side frame part in a manner that the hinge bracket blocks the opening of the first side frame part; and
an end portion of the lower frame part on the first side frame part side is joined to the hinge bracket.

3. The vehicle seat according to claim 2,
wherein on a lower end portion of the second side frame part, a reclining mechanism is provided, the reclining mechanism being configured to rotate the seat back with respect to the seat cushion.

4. The vehicle seat according to claim 3,
wherein the reclining mechanism includes a locking mechanism configured to lock the seat back frame at a given reclining angle; and
the first side frame part side is in a lock-free state in a rotating direction of the seat back frame.

5. The vehicle seat according to claim 1,
wherein the end portion of the lower frame part has an upper portion disposed to limit leaning of the second side frame part toward the first side frame part in response to a lateral force by contacting the second frame part.

* * * * *